United States Patent [19]
Mudd

[11] Patent Number: 5,359,878
[45] Date of Patent: Nov. 1, 1994

[54] APPARATUS AND METHOD FOR IN-LINE CALIBRATION VERIFICATION OF MASS FLOW METERS

[75] Inventor: Daniel T. Mudd, Long Beach, Calif.

[73] Assignee: DXL International, Inc., Torrance, Calif.

[21] Appl. No.: 186,101

[22] Filed: Jan. 25, 1994

Related U.S. Application Data

[63] Continuation of Ser. No. 792,235, Nov. 14, 1991, abandoned, which is a continuation-in-part of Ser. No. 661,570, Feb. 26, 1991, abandoned.

[51] Int. Cl.$^5$ .......................... G01F 1/68; G01F 25/00
[52] U.S. Cl. .......................................................... 73/3
[58] Field of Search ........... 73/204.15, 204.16, 204.18, 73/204.19, 204.25, 204.27, 3

[56] References Cited

U.S. PATENT DOCUMENTS

| | | | |
|---|---|---|---|
| 2,972,885 | 2/1961 | Laub | 73/204.16 X |
| 3,438,254 | 4/1969 | Seeley | 73/204.25 |
| 3,942,378 | 3/1976 | Olmstead | 73/204.16 |
| 4,464,932 | 8/1984 | Ewing et al. | 73/204.15 |
| 4,478,077 | 10/1984 | Bohrer et al. | 73/204.26 |
| 4,682,496 | 7/1987 | Miura et al. | 73/204.16 |
| 4,693,116 | 9/1987 | Miura et al. | 73/204.16 |
| 4,921,005 | 5/1990 | Ohmi et al. | 73/204.25 |
| 4,922,233 | 5/1990 | Twerdochlib | 73/204.25 X |
| 4,984,460 | 1/1991 | Isoda | 73/204.15 |
| 5,036,701 | 8/1991 | Graaf | 73/204.18 X |
| 5,048,332 | 9/1991 | Ishikawa et al. | 73/204.16 |

*Primary Examiner*—Herbert Goldstein
*Attorney, Agent, or Firm*—Spensley Horn Jubas & Lubitz

[57] ABSTRACT

An apparatus for verifying the calibration of a flow meter contains a flow sensor assembly which has a flow tube defining an axial fluid path through the flow sensor assembly; an upstream resistance thermometer in thermal contact with the flow tube; a downstream resistance thermometer in thermal contact with the flow tube, where the two thermometers are operationally connected to a means for producing an output in response to a difference between the heat flows from the first and second resistance thermometers; and means for asymmetrically transferring heat to the first and second resistance thermometers, independently of fluid flow through the flow tube. The calibration of the flow meter's thermal and electronic systems is verified by measuring the flow meter's output in response to a first asymmetric heat transfer, to the upstream and downstream resistance thermometers, when the flow meter is calibrated. The output of the flow meter in response to a second asymmetric transfer, to the upstream and downstream thermometers, is subsequently measured and comparison of the two readings verifies whether the flow meter's thermal and electronic systems remains calibrated.

15 Claims, 4 Drawing Sheets

FIG. 5

APPARATUS AND METHOD FOR IN-LINE CALIBRATION VERIFICATION OF MASS FLOW METERS

CROSS-REFERENCE TO RELATED APPLICATION

This is a continuation of application Ser. No. 07/792,235 filed Nov. 14, 1991 and now abandoned, which is itself a continuation-in-part of application Ser. No. 661,570, filed Feb. 26, 1991, now abandoned. This application is also related to application Ser. No. 789,364, filed Nov. 11, 1991, titled "METHOD FOR IN-LINE CALIBRATION VERIFICATION OF MASS FLOW METERS", now U.S. Pat. No. 5,285.673.

BACKGROUND OF THE INVENTION

1. Field of the Invention

This invention relates to the mechanical arts, in particular, it relates to instruments for measuring and controlling the flow of fluids, such as gases.

2. Discussion of Relevant Art

There have been developed in the art a variety of instruments for measuring and controlling the mass flow of gases ranging from below 5 standard cubic centimeters per minute (SCCM) to more than 500,000 SCCM. The prevalent design of such instruments requires that the flow of the gas be divided into two or more paths.

In a typical flow meter, a small amount of gas is routed through a flow sensor assembly, where the mass flow is measured, while most of the flow is routed through a splitter section located in parallel with the flow sensor assembly. When a flow meter is operationally connected with a valve, the flow meter can be used to control, as well as measure, the flow of gases.

The flow sensor assembly contains a flow tube that carries two resistance thermometers on its outside surface. The resistance thermometers are connected to an electronic circuit which passes current through them causing the resistance thermometers to self-heat. With no gas flow through the capillary tube the sensor assembly containing the resistance thermometers comes to a thermal and electrical equilibrium. The resistance thermometers reach constant temperatures and the power supplied to each remains constant. When gas flows through the capillary tube the equilibrium is disturbed, the upstream resistance thermometer is cooled by heat transfer to the flowing gas and downstream resistance thermometer is either heated or cooled to a lesser extent. If the flow rate of gas remains constant the sensor assembly will come to a new thermal and electrical equilibrium. At the new equilibrium the resistance thermometers settle to new temperatures (resistances), the power supplied to them stabilizes at new levels or some combination of both a shift in temperature and power occurs. The amount of the shift in temperature and power is dependent on the capacity of the gas flowing through the capillary tube to absorb heat. This capacity to absorb heat is the product of the mass flow rate and the specific heat of the gas. Since specific heat of the gas is relatively constant, mass flow rate of the gas can be determined by monitoring the magnitude of the shifts in power to the resistance thermometers and the shifts in temperature of the resistance thermometers from the equilibrium condition with no gas flowing through the sensor.

During manufacture, mass flow meters are calibrated to produce a specific output for a given flow of a specific gas. However, over a period of time, a mass flow meter becomes uncalibrated and its output changes. This phenomenon, called calibration drift, results in inaccurate measurement and control of the gas flow.

Calibration drift can occur if the properties of the flow meter's thermal or electrical systems change from the time of calibration. Common sources of calibration drift include changing thermal conductivity of foams, plastics, wire insulations and epoxies used in fabricating the mass flow meter as they outgas and age; changing resistance of the resistance thermometers as residual stresses are relieved due to repeated heating and cooling of the flow sensor assembly; random minor changes in the geometry of the flow sensor assembly changing the heat transfer to and from the flow sensor assembly; drift in the electronics that amplify and deliver the sensor signal; physical damage to the calibration section; and a buildup of contaminants inside the flow tube impeding heat transfer to the gas and adding additional mass to be heated or cooled during transient flow conditions.

The measurement and control of the flow of gases is important in many industries. During the manufacture of semiconductors, for example, many processes require a precise reaction of two or more gases under carefully controlled conditions. The extreme precision required to make solid state memories, where millions of transistors are deposited on an area the size of a fingernail, could not be possible without the accurate control of the process gases.

As the size of individual devices in integrated circuits has shrunk from several microns to less than one, and as the number of devices per circuit has increased from a few thousand to several million, the accuracy of control of the equipment used to manufacture the devices has become increasingly important. If a flow meter is uncalibrated, the process gases are not supplied in the proper amounts and the resulting integrated circuits exhibit degraded performance, It is not always obvious which step in the complex manufacture of semiconductors is responsible for this degraded performance. Consequently, there is a need for a reliable and cost effective apparatus and method for in-line calibration verification of mass flow meters.

Presently, semiconductor manufacturers use four techniques to ensure the accuracy of mass flow meters;

1. inspecting and testing the silicon wafers after their manufacture has been completed;
2. attaching a reference meter to the end of a gas-line containing an in-line flow meter, flowing gas through the in-line and reference flow meters and then comparing the output of the reference meter to the output of the in-line flow meter;
3. removing the flow meter from the gas-line and replacing it with a freshly calibrated flow meter; or
4. if the manufacturing process is conducted in a vacuum chamber, sealing the chamber discharge and measuring the rise in the pressure and temperature of the known volume of the chamber, after a specific time, during which the flow rate of a gas into the chamber remains constant. The flow rate calculated for the known conditions can then be compared to the flow rate indicated by the flow meter.

The first technique, of course, is associated with a long delay between fabrication and flow observation. Also, an observed flow may or may not be due to a flow rate measuring error.

The second technique involves establishing a known flow of gas through the flow meter, as a reference flow, and observing the flow meter's output. This technique suffers from several drawbacks. Access to the fluid flow system is often limited. In addition, the process of attaching and subsequently removing the reference meter can cause problems with the purity of the reactant gases.

The extreme accuracy required in the fabrication of solid state devices has led some manufacturers to adopt the third technique to ensure that there has been no change in the calibration of their flow meters. Based on the possibility that the flow meter may have become uncalibrated, this technique requires the scheduling of mass flow meters for periodic removal and shipment back to the manufacturer for recalibration.

Typically, the removal of a mass flow meter from a high purity gas line will require hours or days of purging the gas line and the associated equipment to return the system to an acceptable level of purity before the flow meter and associated equipment can be put back into service. The cost of shutting down the equipment can dwarf the more obvious cost and effort associated with the shipment and recalibration of the mass flow meter itself.

The fourth technique takes the chamber and the flow meter out of service for a substantial period.

SUMMARY OF THE INVENTION

Now, in accordance with the invention, there have been found apparatus and method for the in-line verification of the calibration of a flow meter, which overcome the drawbacks of known techniques. The flow meter contains a flow sensor assembly which has a flow tube defining an axial fluid path therethrough; an upstream resistance thermometer in thermal contact with the flow tube; a downstream resistance thermometer in thermal contact with the flow tube, where the two resistance thermometers are operationally connected to a means for asymmetrically transferring heat to the two resistance thermometers, independently of fluid flow through the flow meter; and a means for sensing a function of the heat flows from the two thermometers and either producing an output in response to the heat flow difference or adjusting the power to the individual resistance thermometers to maintain the temperatures of the resistance thermometers a respective reference levels while producing an output in response to the relative power levels of the two resistance thermometers.

In some embodiments, the asymmetric heat transfer is a continuous addition of or removal of heat at a constant rate, while in other embodiments, the asymmetric heat transfer is an addition of or removal of a fixed quantity of heat over a short interval. Representative heat transfer means which add heat include thermal-electric devices, such as resistance coils, or thermal-thermal devices, such as heat pipes. Representative heat transfer means which remove heat include thermal-electric devices which take advantage of the Peltier effect, or thermal-thermal devices, such as heat pipes.

The calibration of the flow meter is verified by measuring its output in response to a first, asymmetric transfer of heat to or from the resistance thermometers, when the flow meter is calibrated. The output of the flow meter in response to a second asymmetric transfer of heat to or from the resistance thermometers is subsequently measured, when its calibration is to be verified. A comparison of the two measurements reveals whether the thermal and electrical systems of the flow meter remain calibrated, at the time of the subsequent measurement.

BRIEF DESCRIPTION OF THE DRAWINGS

FIG. 3A illustrates a flow meter that operates by maintaining constant power to the resistance thermometers, while FIG. 3B illustrates a meter that operates by maintaining constant temperature at the resistance thermometers by varying the power supplied to each resistance thermometer.

DETAILED DESCRIPTION OF THE PREFERRED EMBODIMENTS

As required, details of illustrative embodiments of the invention are disclosed. However, it is to be understood that these embodiments merely exemplify the invention which may take forms different from the specific embodiments disclosed. For example, while the detailed description of the preferred embodiments describes a flow meter alone, it is to be understood that the flow meter can be combined with a valve and used to control the flow of a fluid. Consequently, unless otherwise clearly indicated, the term flow meter as used in the specification and claims includes both flow meters and flow controllers. Structural and functional details are not necessarily to be interpreted as limiting, but as a basis for the claims.

Figure 1:
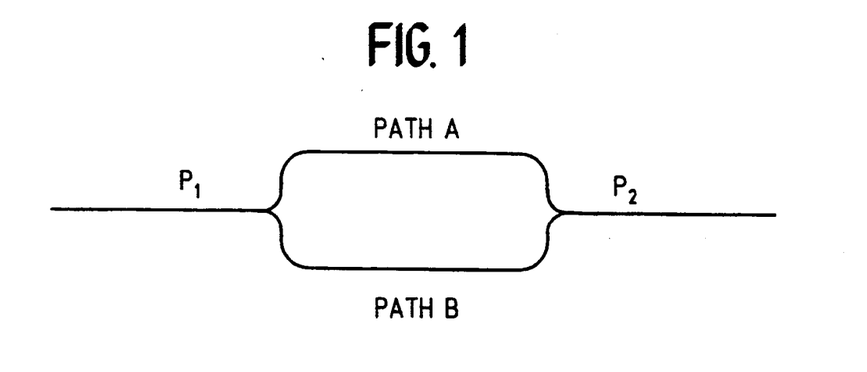
FIG. 1 is a schematic representation of the flow of fluid through the measuring section of a flow meter.

Referring to FIG. 1, fluid paths A and B constitute the flow of a fluid through the measuring section of a flow meter from the inlet $P_1$, to the outlet $P_2$. The line labelled PATH A represents fluid flow through the flow sensor assembly and the line designated PATH B represents fluid flow through the flow splitter section.

In the particular embodiments illustrated herein, PATH A depicts the fluid flow through a flow sensor assembly containing a flow tube of sufficient elongation to assure laminar flow at the desired flow rate. PATH B depicts the fluid flow through a flow splitter which is also constructed and proportioned to assure laminar flow. Representative flow meters are described in U.S. Pat. Nos. 3,938,384 and 4,524,616, which patents are herein incorporated by reference.

Figure 2:
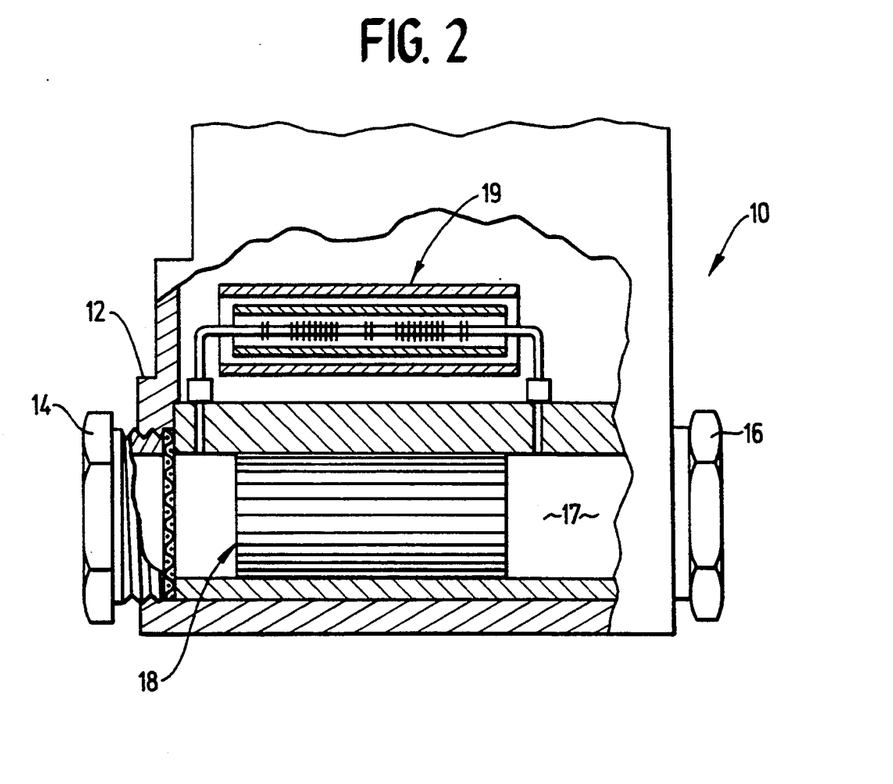
FIG. 2 is an illustration, in partial cross-section, of a flow meter, including a flow sensor assembly.

Referring to FIG. 2, a flow meter 10 has an elongated housing 12 with a fluid inlet 14, a fluid outlet 16 and an axial longitudinal passage 17 between the two. The axial passage 17 contains a flow splitter section 18 and is operationally connected in parallel to a flow sensor assembly 19 which measure the rate of the fluid flow.

Figure 3A:
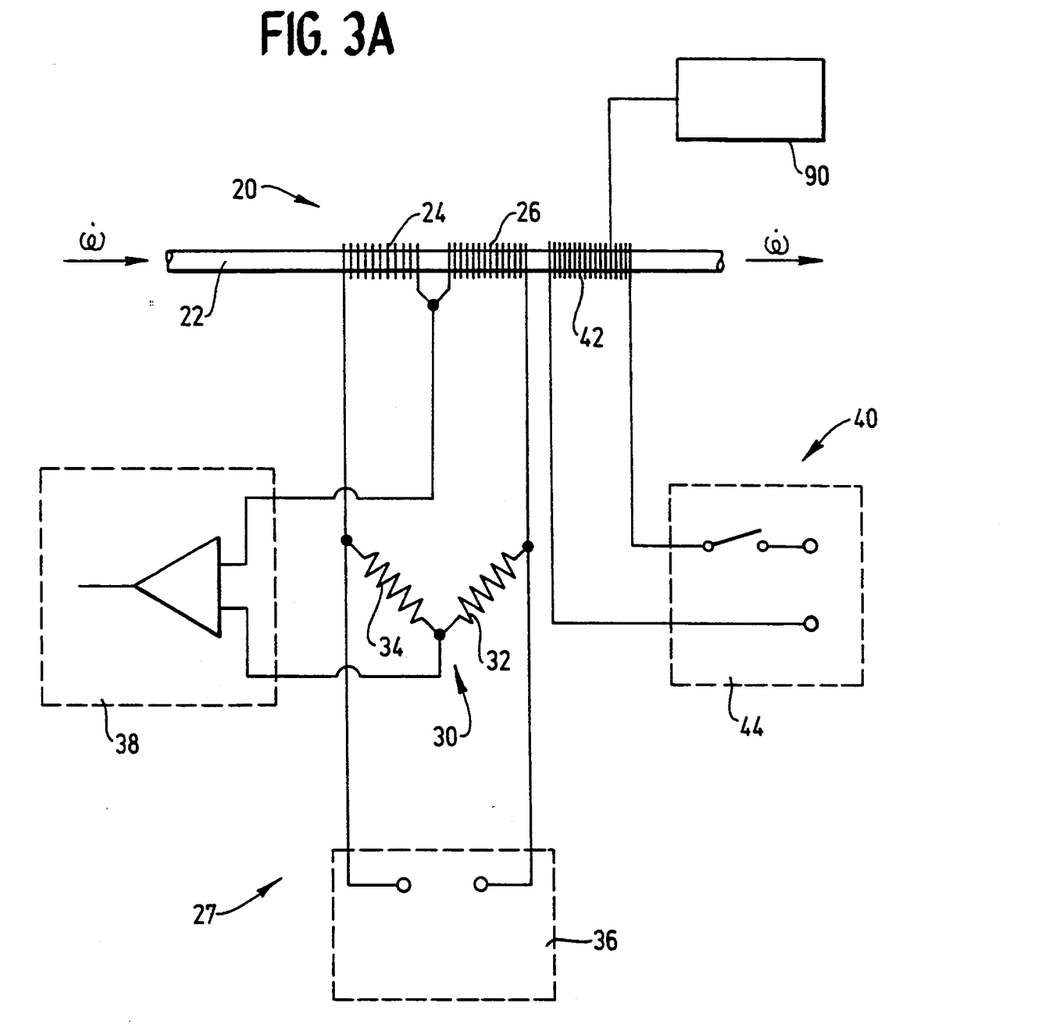
FIGS. 3A and 3B are schematic illustrations of portions of a flow sensor assembly containing embodiments of means for in-line calibration verification in accordance with the invention.

Referring now to FIG. 3A, a portion of a flow sensor assembly 20 is illustrated. The flow sensor assembly 20 includes a flow tube 22 defining an axial fluid path through the assembly. Typically, the flow tube 22 is very thin and elongated, and in this exemplary embodiment has an inside diameter of about 0.25 mm and a length of about 100mm.

In thermal contact with the flow tube 22 are an upstream resistance thermometer 24 and a downstream resistance thermometer 26. The resistance thermometers, 24 and 26, are self-heating wire coils wound around the outside surface of the flow tube 22.

The resistance thermometers, 24 and 26, are operationally connected to a means 27 for producing an output in response to a temperature difference between the upstream and downstream resistance thermometers. The resistance thermometers, 24 and 26, form two legs of an electronic bridge circuit 30. The other two legs are formed by fixed resistors 32 and 34.

The resistance thermometers, 24 and 26, are heated by current supplied to the bridge circuit 30 by a first electrical power source 36. The output of the bridge circuit 30 is amplified by signal amplification section 38. The amplified output is used for monitoring and controlling the gas flow through the flow meter.

In operation, the relatively cool gas to be measured enters the flow sensor assembly 20, at a location that is geometrically and thermally closer to the upstream resistance thermometer 24, than it is to the downstream resistance thermometer 26. As a result of this geometry, the gas absorbs heat from the flow tube in an asymmetric manner with respect to the two resistance thermometers, 24 and 26. This causes the temperature distribution along the flow tube 22 to shift in an asymmetric manner, changing the temperature difference between the upstream and downstream thermometers, 24 and 26. The magnitude of the shift in the temperature distribution along the flow tube 22 and the temperature difference between the resistance thermometers, 24 and 26, is directly related to the capacity of the gas to absorb heat and is a function of the mass flow of the gas through the flow tube. Flow meters of this type are marketed by the Tylan General Company under model designations such as FC-260.

Figure 3B:
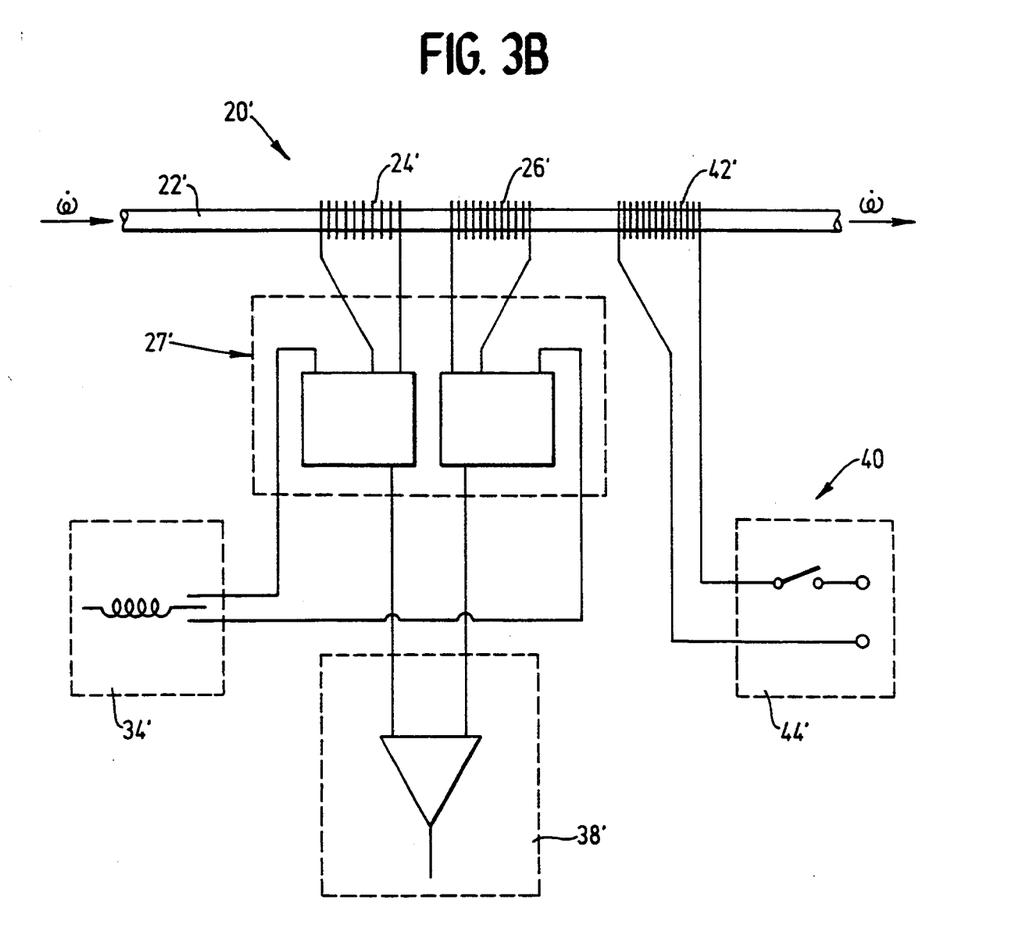

Referring to FIG. 3B, a portion of a flow sensor assembly 20' that operates on nearly constant resistance thermometer temperatures is illustrated. Similar to FIG. 3A the flow sensor assembly 20' includes a flow tube 22' defining an axial fluid path through the assembly and an upstream resistance thermometer 24' and a downstream resistance thermometer 26' in thermal contact with the flow tube 22. The resistance thermometers, 24' and 26' are self-heating wire coils wound around the outside surface of the flow tube 22'.

The resistance thermometers, 24' and 26' are operationally connected to a constant temperature difference circuit 27' capable of: sensing the temperature (resistance) of the resistance thermometers; sensing the temperature of the surrounding environment via a resistor, thermistor or resistance thermometer 34' located in the ambient environment away from the self-heating heating resistance thermometers; adjusting the power supplied to the resistance thermometers 24' and 26' to maintain the resistance thermometers at respective constant temperatures above the ambient surroundings; and producing an output in response to the difference between the power supplied to the upstream and downstream resistance thermometers. This output is amplified by the amplification section 38' and used for monitoring and controlling the flow of gas through the flow meter.

In operation, the relatively cool gas to be measured enters the flow sensor assembly 20', at a location that is geometrically and thermally closer to the upstream resistance thermometer 24', than it is to the downstream resistance thermometer 26'. As a result of this geometry, the gas absorbs heat from the flow tube in an asymmetric manner with respect to the two resistance thermometers, 24' and 26'. This causes the temperature of the upstream resistance thermometer to begin to decrease and the temperature of the downstream thermometer to either increase or decrease to a lesser extent. The constant temperature difference circuit 27' senses the dropping resistance of the upstream resistance thermometer 24' and increases the power until the resistance thermometer regains its reference temperature above the ambient conditions. Similarly the temperature of the downstream resistance thermometer 26' is maintained. A signal related to the difference in power supplied to the upstream and downstream resistance thermometers is amplified by the signal amplification section 38'. The amplified signal is used for monitoring and/or controlling gas through the flow meter. Flow meters of this type are marketed by the Lintec Company under model designations such as MC-100 and MC-200.

In some embodiments, a flow sensor assembly includes an independent heater (not shown) between the two resistance thermometers. Typically, the heater is operated at a constant power distribution and the two thermometers are operated at a very low power level, so that they do not add appreciable heat to the system.

Now, in accordance with the invention, in-line calibration verification is made possible by incorporating a means for asymmetrically transferring heat to the resistance thermometers, independently of fluid flow through the flow meter. This invention can be applied to the two major families of mass flow meters dominating the current market.

The first family will be referred to as Temperature Sensing Flow Meters in future discussions. This family of flow meters determines mass flow by measuring the temperature difference between the two resistance thermometers. In Temperature Sensing Flow Meters the asymmetric heat transfer means changes the temperature distribution along the flow tube, shifting the relative temperature of the two resistance thermometers with respect to one another. This change in the temperature difference between the two resistance thermometers is sensed and causes a change in the output of the flow meter similar to that caused by the asymmetric cooling effect of gas flowing through the flow tube but does not require actual gas flow.

The second family of flow meters will be referred to as Power Sensing Flow Meters in future discussions. This second family of flow meters determines mass flow by measuring the difference in power supplied to the individual resistance thermometers required to maintain the thermometers at a constant temperature above ambient. In Power Sensing Flow Meters the heat transfer means also changes the temperature distribution along the tube and results in different power levels being required at the resistance thermometer to maintain their constant temperature above ambient. The change in power supplied to the resistance thermometers is sensed and causes a change in the output of the flow meter similar to that caused by the asymmetric cooling effect of gas flowing through the flow tube but does not require actual gas flow.

The asymmetric heat transfer means can continuously transfer heat at a constant rate or transfer a fixed quantity of heat nearly instantaneously. The asymmetric heat transfer can be either positive—heat added to the flow tube—or negative—heat removed from the flow tube. Representative heat transfer means which add heat include thermal-electric devices, such as resistance coils, or thermal-thermal devices, such as heat pipes. Representative heat transfer means which remove heat include thermal-electric devices which take advantage of the Peltier effect, or thermal devices, such as heat pipes.

Changes in the thermal or electrical characteristics of a flow meter which cause calibration drift in a flow meter's output in response to a gas flow, will also cause a calibration drift in response to the asymmetric heat transfer. The temperature difference in the case of Temperature Sensing Flow Meters and the power level difference in the case of Power Sensing Flow Meters between the upstream resistance thermometer 24 (24') and the downstream resistance thermometer 26 (26') is affected by the direction of heat transfer—whether heat is added or removed—and the location of the heat transfer means 40. In addition, the magnitude of the temperature difference or power difference between the two resistance thermometers, 24 (24') and 26 (26'), is proportional to the rate of heat transferred, when the heat is transferred continuously, or to the quantity of heat transferred, when a finite quantity of heat is transferred during a short period of time.

Heat addition thermally closer to the downstream resistance thermometer, than to the upstream resistance thermometer, and heat removal thermally closer to the upstream resistance thermometer, than to the downstream resistance thermometer, lowers the temperature of the upstream thermometer relative to the downstream thermometer in Temperature Sensing Flow Meters and lowers the power level supplied to the downstream thermometer relative to the upstream thermometer in Power Sensing Flow Meters. Conversely, heat addition thermally closer to the upstream resistance thermometer and heat removal from the downstream resistance thermometer raises the temperature of the upstream thermometer relative to the downstream resistance thermometer in Temperature Sensing Flow Meters and raises the power level supplied to the downstream thermometer relative to the upstream thermometer in Power Sensing Flow Meters.

In preferred embodiments, the heat transfer means 40 adds heat thermally closer to the downstream resistance thermometer than to the upstream resistance thermometer or removes heat thermally closer to the upstream resistance thermometer than to the downstream resistance thermometer. These embodiments increase the flow meter's positive output, as the rate of heat transfer is increased. Since flow meters typically have only a limited capability to display negative outputs—typically less than 15% of their capability to display positive outputs—these embodiments allow calibration to take advantage of the flow meter's large positive output capability and thus provide for increased accuracy.

The heat transfer means 40 asymmetrically adds heat to the upstream and downstream resistance thermometers, 24 and 26. The means 40 is a self-heating calibration coil 42 wound around the flow tube 22. The coil 42 is operationally connected to a second electrical power source 44. The power source 44 supplies the electrical power that is converted into heat energy by the calibration coil 42 and asymmetrically transferred to the resistance thermometers, 24 and 26, through flow tube 22.

The calibration coil 42 is located downstream of the downstream resistance thermometer 26. It is preferably located as close to the downstream thermometer 26 as possible. This maximizes the heat which is transferred to the downstream thermometer 26 and minimizes the heat which is lost to the area surrounding the flow sensor assembly 20. In those embodiments where both the downstream resistance thermometer 26 and the calibration coil 42 are made of insulated wire, the calibration coil can be wound directly on top of the downstream resistance thermometer.

In some embodiments, the calibration coil 42 is formed of resistance thermometer wire. In order to facilitate the control of the power applied through the wire, it is desirable that the wire have a resistance of from about 10 to about 30,000 ohms, preferably about 100 to 1,000 ohms, most preferably about 600 ohms. By measuring the voltage and current supplied to the calibration coil, the power supplied to the resistance thermometers, 24 and 26, is determined.

In other embodiments, the calibration coil 42 is made of a wire, such as Evanohm, having a low temperature coefficient, so that the resistance of the coil does not change appreciably with temperature. The temperature coefficient is substantially zero over a temperature range of from about zero to about 250 degrees Fahrenheit. In these embodiments, the power is easily measured and controlled, simply by monitoring either voltage or current to the coil. Monitoring of both is not required.

Figure 4:
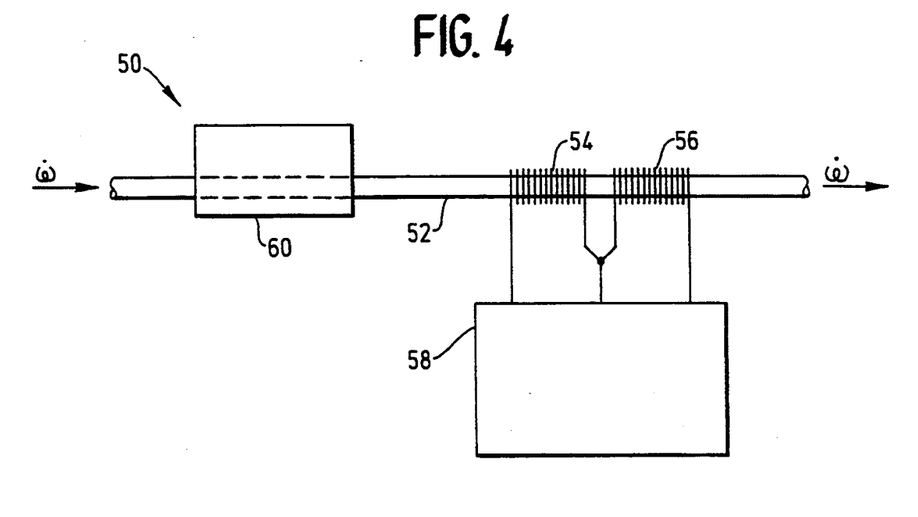
FIG. 4 is a schematic illustration of a portion of a flow sensor assembly containing another embodiment of a means for in-line calibration verification in accordance with the invention.

Referring now to FIG. 4, there is shown another embodiment of a portion of a flow sensor assembly 50 in accordance with the invention. The flow sensor assembly 50 includes a flow tube 52 defining an axial fluid path through the assembly. In thermal contact with the flow tube 52 are an upstream resistance thermometer 54 and a downstream resistance thermometer 56. The upstream resistance thermometer 54 and the downstream resistance thermometer 56 are operationally connected to a means 58 for producing either an output in response to a temperature difference between the upstream and downstream thermometers in a Temperature Sensing Flow Meter or an output in response to the difference in power supplied to the upstream and downstream thermometers in a Power Sensing Flow Meter.

A means 60 for asymmetrically removing heat from the resistance thermometers, 54 and 56, independently of fluid flow through the flow meter, is located upstream of the upstream thermometer. The heat removal means 60 changes the temperature distribution along the flow tube 52 relative to the downstream thermometer 56 in Temperature Sensing Flow Meters and lowers the power level supplied to the downstream thermometer 54 relative to the upstream thermometer 52 in Power Sensing Flow Meters. The heat removal is typically made by either a thermal-electric device or a thermal-thermal device. Representative thermal-electric devices include devices that take advantage of the Peltier effect, i.e. devices where current is sent through a circuit containing a thermocouple, so that heat is given out at one junction, and absorbed at the junction in thermal contact with the flow tube 22. Representative thermal-thermal devices include heat pipes.

Drift in the calibration of the flow meter is detected by measuring the output of the flow meter in response to a first, asymmetric heat transfer to the resistance thermometers, at the time the flow meter is being calibrated. The output of the flow meter in response to a second, asymmetric heat transfer to the resistance thermometers is subsequently measured. The magnitude of any change in the calibration of the flow meter, due to changes in the flow meter's thermal and electronic characteristics, is revealed by a comparison of the two measurements.

Each of these measurement must be made in the presence of a known flow rate. A zero flow rate allows the most convenient measurement operation.

In some embodiments, the heat is transferred at substantially identical, constant rates, until the flow meter's output stabilizes at a steady state value, during both the first and second measurements. In other embodiments, substantially identical quantities of heat are transferred in a short time, during both the first and second measurements. Since the heat transfer during the first and second measurements are substantially identical, it is not necessary to measure the magnitude of the heat transfer at the constant rate or to measure the total amount of heat transferred in a short time.

In these embodiments, the first and second outputs are substantially identical, so long as the thermal and electrical systems of the flow meter remain calibrated. Any difference in the outputs is an indication that the flow meter is no longer calibrated and an indication of the magnitude of the calibration drift.

Each measurement produces a flow rate indication and a change in calibration will correspond to the ratio between the flow rates indicated by two measurements performed at different times. For example, if the measurement obtained as the result of an asymmetric heat transfer at the time of calibration represents a flow rate of 50% and a subsequent measurement involving an identical asymmetric heat transfer represents a flow rate of 100%, it is known that there has been a calibration drift which can be corrected by reducing the gain of the output amplifier 38 or 38' by 50%.

In other embodiments, the heat transfers are not substantially identical, but have different magnitudes. In these embodiments, it is necessary to measure the heat transferred during each measurement, so that the variation between heat transfers can be compensated for, when comparing the first and second outputs.

Since the output of the flow meter is proportional to the magnitude of the heat transfer, a linear adjustment factor can be calculated to compensate for output readings resulting from transfers of different magnitudes. In these embodiments, the outputs are compared, after the measurements have been normalized using the ratio of their different magnitudes.

In some embodiments, heat is continuously transferred at a constant rate. In these embodiments, the output from the amplification section is allowed to approach a steady state value, prior to being recorded for comparison purposes.

Other embodiments are particularly useful for detecting an out-of-calibration condition due to the internal clogging of the flow tube. A known quantity of heat is transferred in a nearly instantaneous pulse to the flow tube, when the first and second measurements are made. The pulse preferably lasts from about 0% to about 100% of one thermal time constant for the system constituted by the gas whose flow is being measured, the tube through which the gas is flowing, the resistance wires wrapped around the tube and the thermal environment of the tube. More preferably, the pulse lasts less than about 5% of one time constant.

When pulses are used, the output of the amplification section 38 does not approach a steady state, but the output is a transient value with time.

In these embodiments, the peak value is, typically, recorded for comparison purposes.

The peak value of the transient output is influenced by the thermal mass to or from which heat is transferred. Consequently, if between the first and second measurements, the interior of the flow tube begins to become clogged with contaminants, the thermal mass of the contaminants is added to the total thermal mass to be heated. As a result, if the flow tube has begun to become clogged with contaminants, the peak value of the second measurement is less than first peak value.

If a calibration shift is detected, the flow meter can be replaced. Alternatively, adjustments in the gain and linearity of the flow meter's output can be made to reestablish calibration.

It is an advantage of the apparatus and method in accordance with this invention, that they do not require a flow of gas through the flow meter, as a reference. However, in those embodiments where it is not practical or desirable to cut off the fluid flow, the rate of flow of fluid through the flow tube is held constant during both the first and second measurements.

Figure 5:
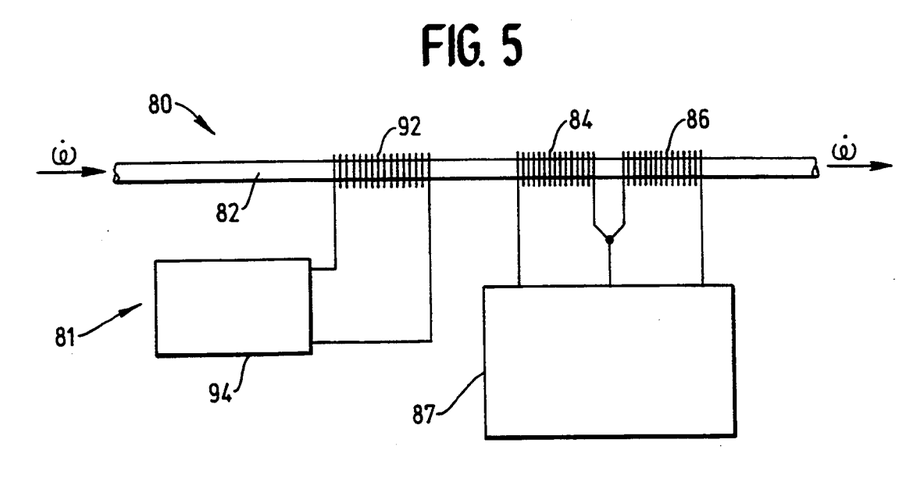
FIG. 5 is a schematic illustration of a portion of a flow sensor assembly containing another embodiment of a means for the in-line calibration verification in accordance with the invention.

In some embodiments, the means for asymmetrically transferring heat raises the temperature of the upstream thermometer relative to the downstream resistance thermometer in Temperature Sensing Flow Meters and raises the power level supplied to the downstream thermometer relative to the upstream thermometer in Power Sensing Flow Meters. Referring to FIG. 5, there is shown a flow sensor assembly 80 containing a means 81 for asymmetrically transferring heat, to an upstream resistance thermometer and a downstream resistance thermometer, independently of fluid flow through the flow meter.

The flow sensor assembly 80 includes a flow tube 82 defining an axial fluid path through the assembly. In thermal contact with the flow tube 82 are an upstream resistance thermometer 84 and a downstream resistance thermometer 86, operationally connected to a means 87 for producing an output in response to either the temperature difference between the upstream and downstream resistance thermometers for Temperature Sensing Flow Meters or to the difference in power supplied to the upstream and downstream resistance thermometers for Power Sensing Flow Meters.

The heat transfer means 81 is a self-heating, calibration coil 92 wound around the flow tube 82. A second electrical power source 94 is used to heat the calibration coil 92.

The calibration coil 92 is located upstream of the upstream resistance thermometer 84. It is preferably located as close to the upstream resistance thermometer 84 as possible. This maximizes the heat which is transferred to the upstream thermometer 84 and minimizes the heat which is lost to the area surrounding the flow sensor 80. In those embodiments where both the upstream resistance thermometer 84 and the calibration coil 92 are made of insulated wire, the calibration coil can be wound directly on top of the upstream resistance thermometer.

As the heat transfer means adds heat to the flow tube thermally closer to the upstream resistance thermometer 84 than to the downstream resistance thermometer 80, the flow meter's output decreases, as the rate of heat addition increases. Therefore, measurements taken at or near the maximum operating flow of the flow meter, take advantage of the full range of the flow meter's signal amplification, and provide the greatest accuracy.

To verify the calibration of a flow meter using the embodiment shown in FIG. 5, a calibrated flow meter is set to deliver a first, flow at or near its maximum rate. Once the flow rate has stabilized, the flow is fixed at the stabilized rate and the calibrated flow meter's output is measured. Heat is then transferred, at an increasing rate, to reduce the calibrated flow meter's output, until a first output, typically zero, is reached.

To verify that the flow meter remains calibrated, the flow meter is subsequently set to deliver a flow rate which is substantially identical to the first rate. Once the rate has stabilized, it is fixed at the stabilized rate and heat is again transferred, at an increasing rate, until an output, which is the same as the first output, is reached. A comparison of the rate of heat transfer necessary to obtain the same outputs reveals any change in the calibration of the flow meter, due to changes in the flow meter's thermal and electronic characteristics, and the magnitude of the change.

Referring again to FIG. 3A, it is an advantage of this embodiment that it is readily adapted to measure the temperature of the flow tube 22. If the calibration coil 42 is fabricated of resistance thermometer wire, then the second electrical power source 44 can supply the power necessary to cause the calibration coil to become a third resistance thermometer. The temperature of the flow tube 22, at the calibration coil 42, is measured by operationally connecting the calibration coil to a means 90 for measuring the resistance of the calibration coil. When the resistance of the calibration coil 42 is measured at a known temperature, a comparison of this resistance to the resistance of the coil at a subsequent time enables the coil's subsequent temperature to be determined.

Such embodiments can provide another, relatively rough, method for verifying whether the flow meter's thermal systems are calibrated. Calibration is verified by measuring the ambient temperature, using conventional techniques, and the temperature of the calibration coil, when the flow meter is calibrated, and determining the difference between the two temperatures. At the time of verification, the ambient temperature and the temperature of the calibration coil are again measured and their difference determined. A comparison of the temperature difference between the ambient temperature and the temperature of the calibration coil at the time of calibration and at the time of verification provides a relatively rough indication of whether the flow meter's thermal system remains calibrated.

The embodiment where the calibration coil 42 acts as a temperature sensor has uses other than in the in-line calibration verification of mass flow meters. For example, it is a desideratum to measure the temperature of the process gases during the manufacture of semiconductors. Temperature data can be used to refine flow meter accuracy, by allowing thermal compensations of the flow meter's output to correct for temperature effects on the flow meter's electronics and on the variation in specific heat that some gases display with temperature. This can now be accomplished with the apparatus in accordance with this invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for verifying the calibration of a flow meter having a flow tube defining an axial fluid flow path, first and second resistance thermometers, in thermal contact with the flow tube, means for supplying electric power to the resistance thermometers, means for producing an output in response to a difference between the electric power being supplied to the first resistance thermometer and the electric power supplied to the second resistance thermometer, and heat transfer means for effecting asymmetric heat transfer between the heat transfer means and the resistance thermometers, said method comprising:

controlling the power supplied to each of the resistance thermometers to maintain each of the resistance thermometers at a respective constant temperature;

effecting a first asymmetric heat transfer between the heat transfer means and the first and second resistance thermometers independently of fluid flow through the flow tube, when the flow meter is calibrated;

measuring the output of the flow meter in response to the first asymmetric heat transfer;

subsequently effecting a second asymmetric heat transfer between the heat transfer means and the first and second resistance thermometers and measuring the output in response to the second asymmetric heat transfer, said first and second heat transfers simulating fluid flow through said flow tube, and then comparing the two outputs.

2. The method in accordance with claim 1, wherein the heat transfer means adds heat to the resistance thermometers.

3. The method in accordance with claim 2, wherein the heat transfer means continuously adds heat at a constant rate.

4. The method in accordance with claim 3, wherein the first and second heat additions are substantially identical.

5. The method in accordance with claim 3, wherein the first and second heat additions differ in magnitude.

6. The method in accordance with claim 2, wherein the heat transfer means adds a fixed quantity of heat in a pulse.

7. The method in accordance with claim 6, wherein the pulse has a duration not greater than about 100% of one thermal time constant of a thermal system via which heat flows between fluid in the flow meter and the environment of the flow meter.

8. The method in accordance with claim 6, wherein the pulse lasts less than about 5% of one thermal time constant of a thermal system via which heat flows between fluid in the flow meter and the environment of the flow meter.

9. The method in accordance with claim 1, wherein the heat transfer means removes heat from the resistance thermometers.

10. The method in accordance with claim 9, wherein the heat transfer means continuously removes heat at a constant rate.

11. The method in accordance with claim 10, wherein the first and second heat removals are substantially identical.

12. The method in accordance with claim 10, wherein the first and second heat additions differ in magnitude.

13. The method in accordance with claim 9, wherein the heat transfer means removes a fixed quantity of heat in a pulse.

14. The method in accordance with claim 13, wherein the pulse has a duration not greater than about 100% of one thermal time constant of a thermal system via which heat flows between fluid in the flow meter and the environment of the flow meter.

15. The method in accordance with claim 13, wherein the pulse lasts less than about 5% of one thermal time constant of a thermal system via which heat flows between fluid in the flow meter and the environment of the flow meter.

* * * * *